June 8, 1965
P. J. CLIFFORD ETAL
3,187,822
EARTH WORKING TOOL AND IMPLEMENT GUIDE
Filed April 8, 1964
4 Sheets-Sheet 1
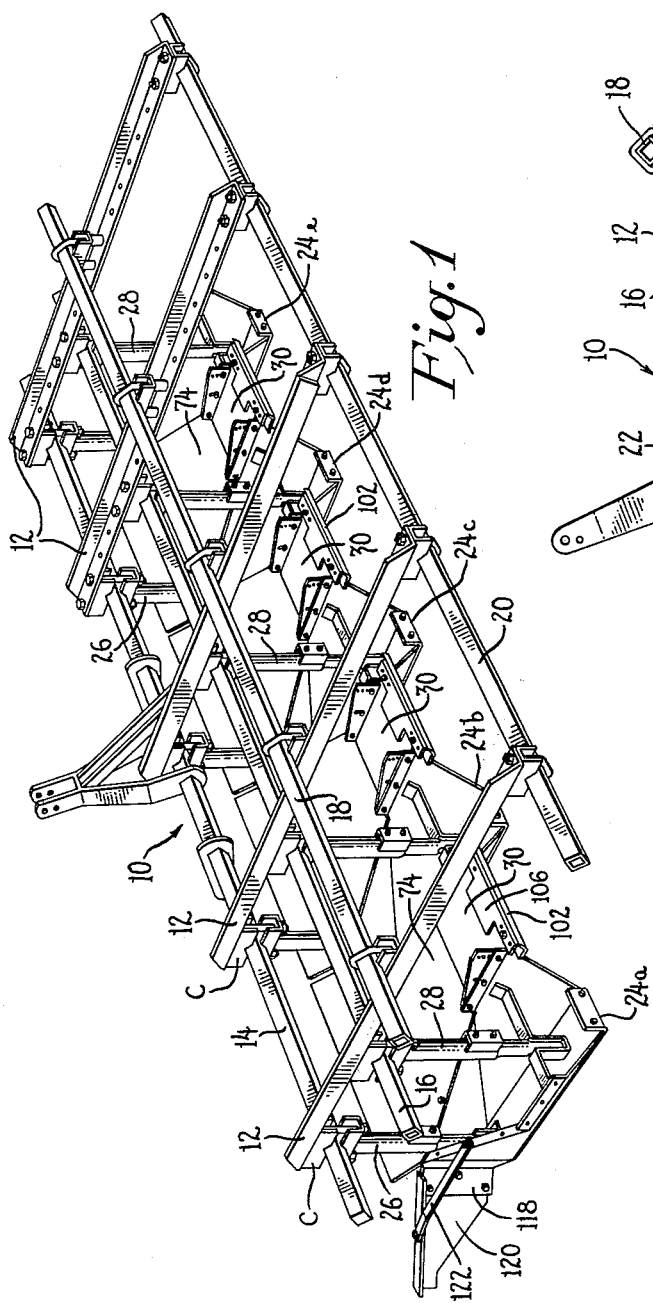
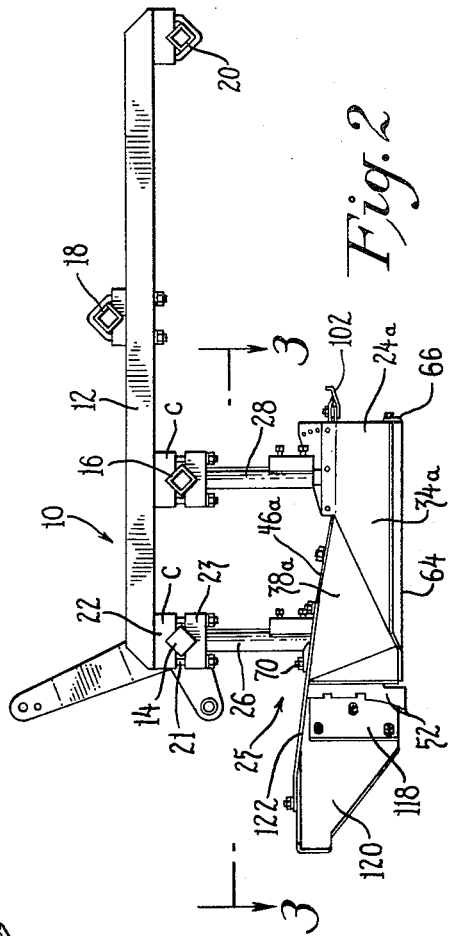
INVENTORS.
PETER J. CLIFFORD &
ROBERT J. NOTMAN
BY Tweedale & Gerhardt
ATTORNEYS.

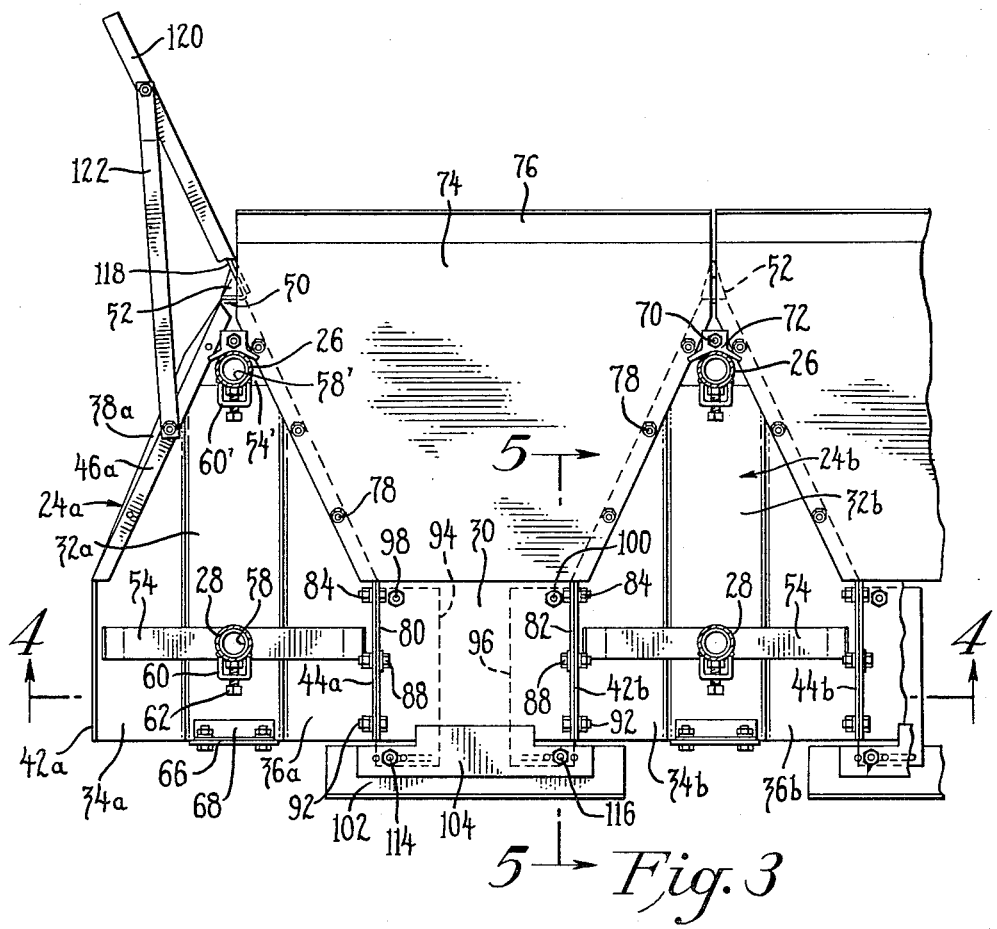
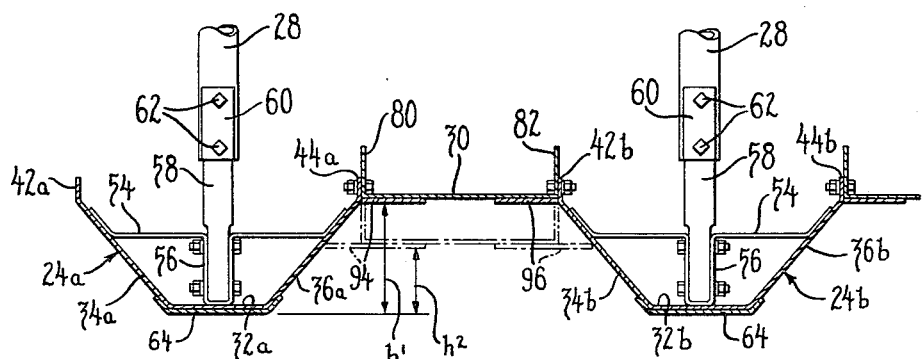

June 8, 1965   P. J. CLIFFORD ETAL   3,187,822
EARTH WORKING TOOL AND IMPLEMENT GUIDE
Filed April 8, 1964   4 Sheets-Sheet 3

INVENTORS.
PETER J. CLIFFORD &
BY ROBERT J. NOTMAN
Tweedale & Gerhardt
ATTORNEYS.

June 8, 1965 P. J. CLIFFORD ETAL 3,187,822
EARTH WORKING TOOL AND IMPLEMENT GUIDE
Filed April 8, 1964 4 Sheets-Sheet 4
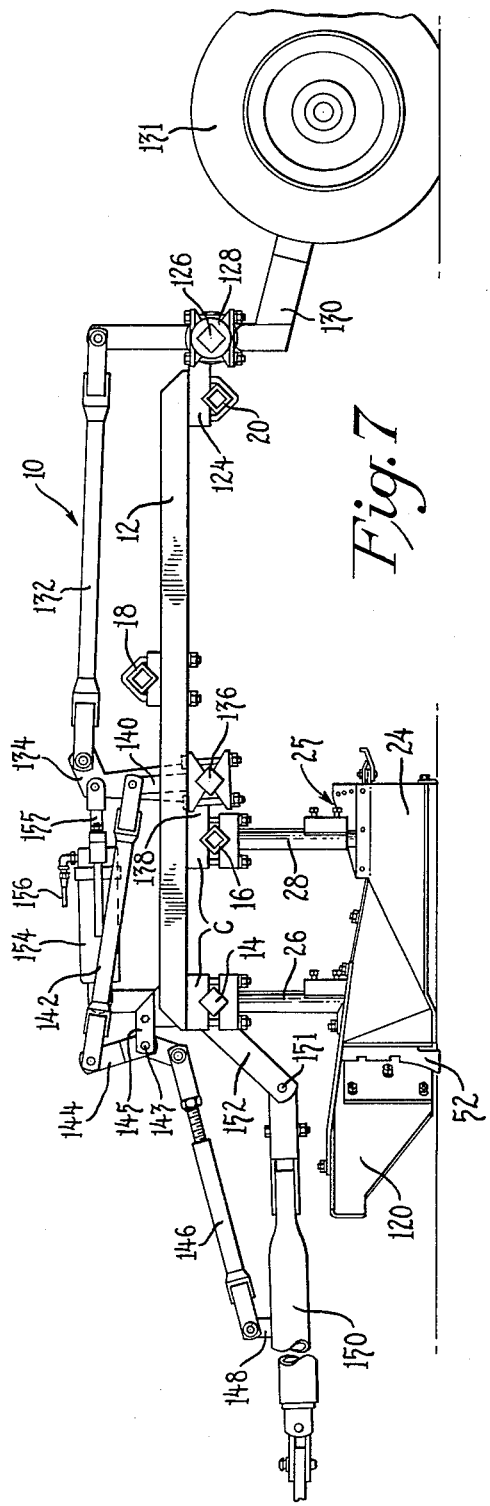
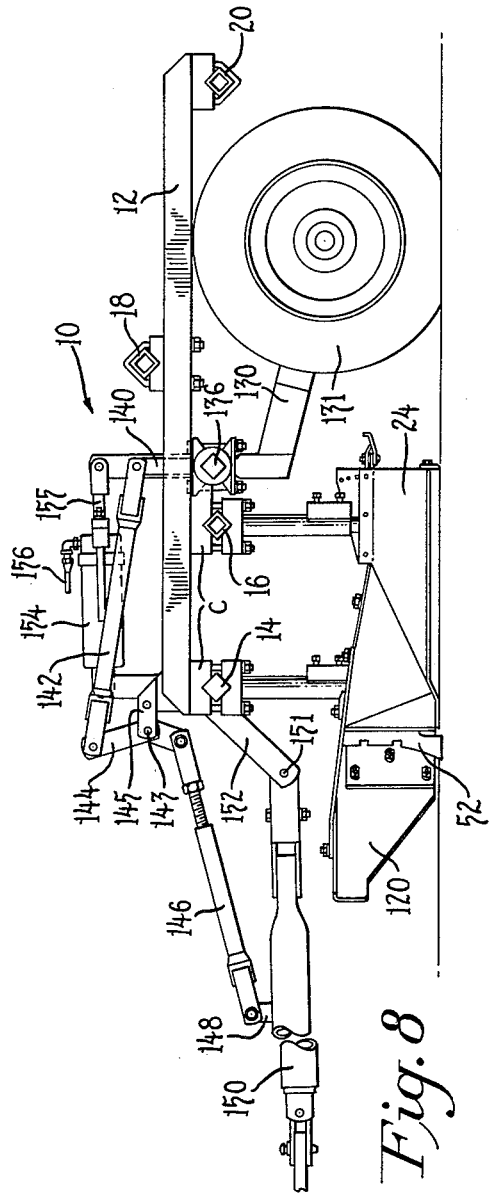
INVENTORS.
PETER J. CLIFFORD &
BY ROBERT J. NOTMAN
Tweedale & Gerhardt
ATTORNEYS.

United States Patent Office 3,187,822
Patented June 8, 1965

3,187,822
EARTH WORKING TOOL AND IMPLEMENT
GUIDE
Peter J. Clifford and Robert J. Notman, Fresno, Calif., assignors to Massey-Ferguson Inc., Detroit, Mich.
Filed Apr. 8, 1964, Ser. No. 358,302
4 Claims. (Cl. 172—701)

This invention relates generally to earth working tools for agricultural equipment, and is particularly concerned with implements for shaping beds and furrows for row crops prior to seeding.

In the preparation of soil for row crop planting, generally the soil is first loosened by plowing and discing. Seed beds are then formed in the loosened soil with a furrow between each adjacent pair of seed beds. After planting, cultivating implements must be accurately guided along the rows performing their various operations.

An object of this invention is to provide an earth working implement that can be employed to shape beds for row crops as well as to thereafter to serve as a guide for cultivating equipment as it is towed or driven along the previously formed beds.

Another object is to provide an adjustable row crop bed shaping unit in which the size of the beds formed thereby can be selectively varied.

Still another object is to provide an earth working tool for forming an elevated seed bed having inclined walls in which the height of the bed can be selectively increased or decreased.

In achievement of the foregoing, and other objects, a shaping unit according to the present invention includes a plurality of guides or runners each shaped to form a furrow with inclined, upwardly diverging side walls, the inclined walls also forming the side walls of the seed bed. Adjacent pairs of the guides are connected by a bed shaping panel which is pivotally connected at one of its end with the guides. By pivoting the bed shaping panel upwardly or downwardly relative to the bottom wall of the guides, the height of the bed that will be formed can be varied accordingly. In order to accommodate the bed shaping panel to the inclined walls of the guides, extension plates are secured to the bed shaping panel which can be extended beyond the edges of the panel to engage the inclined side walls of the guides as the panel is adjusted vertically relative to the guides.

Other objects and advantages of the invention will become apparent from the following description, taken in connection with the accompanying drawings, in which:

FIG. 1 is a perspective view of a tool carrier supporting an earth working implement embodying the invention in its preferred form;

FIG. 2 is an end view taken from the left hand and of FIGURE 1;

FIG. 3 is a partial plan view of the bed shaping unit taken on lines 3—3 of FIGURE 3;

FIG. 4 is a sectional view taken on line 4—4 of FIG. 3;

FIG. 7 is an end view of the tool carrier of FIG. 1 with draft links and leveling system; and FIG. 8 is a view similar to FIG. 7 showing an alternate form of the leveling system.

Figure 5:
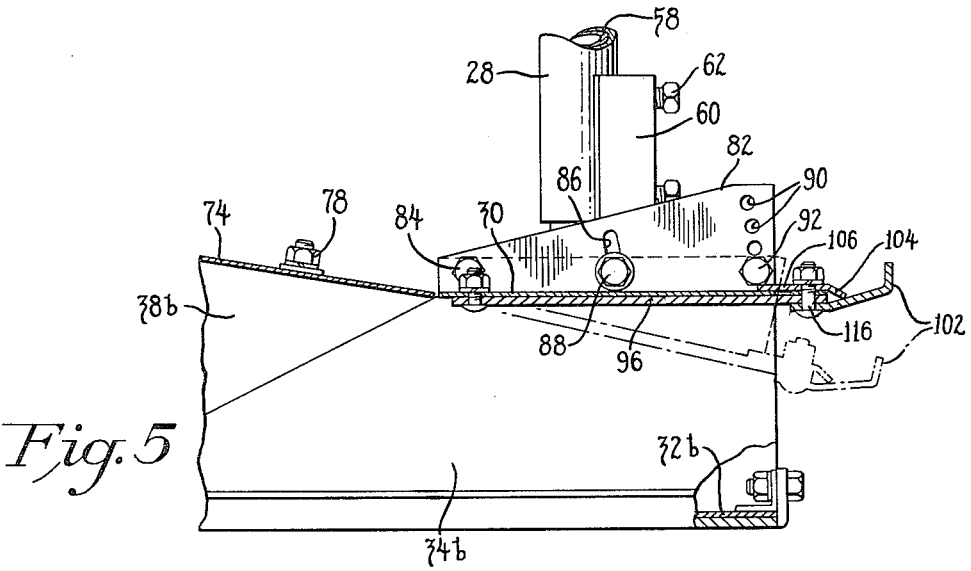
FIG. 5 is a sectional view taken on line 5—5 of FIG. 3.

With reference particularly to FIGURES 1 and 2, reference numeral 10 designates generally a tool carrier including a plurality of spaced longitudinal frame members 12 made up of angle bars to which are secured conventional tool bars 14, 16, 18 and 20.

Tool bars 14 and 16 are secured to frame members 12 by clamp member C each comprising an upper clamp member 22, a lower clamp member 23, and a conventional U-bolt 21 as shown in FIGURE 2. Clamp members 22 and 23 are suitably notched for receiving the non-circular tool bars.

Supported beneath tool bars 14 and 16 by means of adjustable standards 26 and 28 is a bed shaper and cultivator guide assembly 25. Assembly 25 includes a plurality (in this case 5) of cultivator guides 24a, 24b, 24c, 24d, and 24e. Adjacent pairs of guides 24 are connected by an adjustable bed shaping panel 30.

Since guides 24a, b, c, d and e are identical in construction, guide 24a only will be described in detail. When necessary, corresponding elements of the remaining guides will be referred to by the same reference numeral followed by the appropriate subscript b, c, d or e. Referring to FIGURES 2, 3 and 4, each guide 24 is formed with a bottom wall 32, side wall panels 34 and 36, and front wall panels 38 and 40. In FIGURES 2, 3 and 4, the latter elements are designated for guide 24a and 32a, 34a, 36a, and 38a, respectively. Side wall panels 34a and 36a are inclinded upwardly and outwardly from the side edges of bottom wall 32a, and are each formed with vertical flanges 42a and 44a, respectively, at their upper edges. Flanges 42a and 44a are preferably disposed in parallel relationship with the longitudinal axis of guide 24a. Front panels 38a and 40a are each formed at their upper edges with inwardly directed horizontal flanges 46a and 48a, and converge toward the front from side panels 34a and 36a to the front end 50 of the guide. A fitting 52 of generally triangular cross section is secured to the front end 50 to define a point for the guide member.

Secured to the inner sides of side wall panels 34a and 36a is a support strap 54 formed with a central U-shaped section 56 in which is received the lower leg 58 of the rear adjustable standard 28. Leg 58, which preferably is in the form of a hollow tubular section is telescopically received in the outer tubular section 28. Mounted on the outer tubular section of standard 28 is a bracket 60 in which is mounted a pair of set screws 62 for selectively adjusting the position of leg 58 relative to section 28. The front standard 26 is mounted at the forward end of guide 24 by similar structure designated by reference numerals 58', 54' and 60' corresponding, respectively, with elements 58, 54 and 60.

Secured to the bottom of each guide 24 is a wear plate 64 having a rear, vertical flange 66 which is secured to the vertical flange of a retaining angle 68 mounted on the upper surface of bottom wall 32. Projecting upwardly from the forward end of wear plate 64 is a bolt 70 which is inserted through an aperture in bottom wall 32 and is secured to a clamp bracket 72 by means of a conventional nut as shown in FIGS. 1 and 3.

The upper edges of front panels 38a and 40a slope upwardly toward the front end of the guide as shown in FIG. 2. Secured between the forward ends of each adjacent pair of guides 24, is a fixed panel or shield 74. Panel 74 is detachably secured to flanges 48a and 46b of guides 24a and 24b, respectively, by means of conventional fasteners 78 (FIG. 3). Formed at the forward end of panels 74 is an upwardly inclined lip or flange 76.

With reference particularly to FIGURES 3, 4, 5 and 6, bed shaping panel 30 is formed with a pair of vertical side flanges 80 and 82 which in FIGURES 3 and 4 are pivotally connected with flanges 44a and 42b, respectively, by means of bolts 84. Thus panel 30 pivots about a horizontal axis normally disposed to the longitudinal axis of the guides. Formed in flanges 80 and 82 intermediate their ends is an arcuate slot 86 (FIG. 5). Conventional threaded fasteners 88 extend through slot 86 into openings in flanges 42 and 44 of each of the guides 24 for frictionally securing panel 30 against angular adjustment about bolts 84. Formed at the rear, or trailing ends, of flanges 80 and 82 of bed shaping panel 30, is a plurality (in this instance 4) of apertures 90. In FIGURE 5, panel 30 is shown in its uppermost position in which it is substantially parallel to bottom wall 32 of the guides 24 with a fastener 92 received in the lowermost aperture 90 at the ends of flanges 80 and 82. Fasteners 92 extend through corresponding openings in flanges 44 and 42 to positively secure panel 30 against angular adjustment. As illustrated in the full line positions of FIGS. 4 and 5, the side edges of panel 30 are disposed in parallel, contiguous relationship with the upper edges of guides 24a and b such that panel 30 bridges the space between flanges 44a and 42b.

Figure 6:
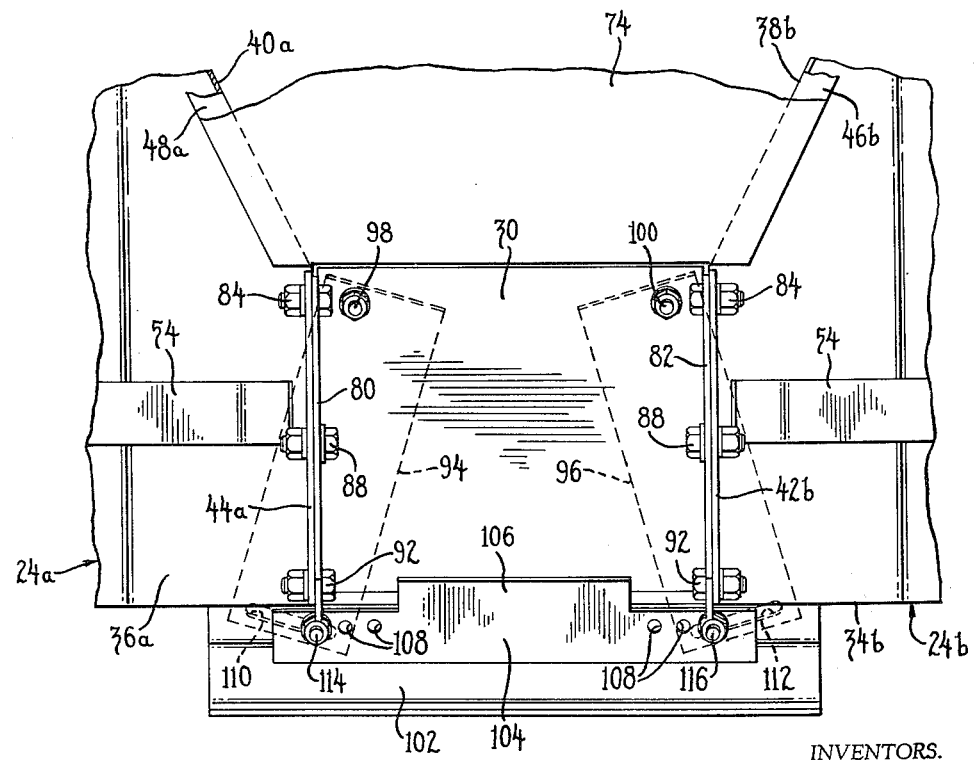
FIG. 6 is an enlarged plan view of the adjustable bed shaping panel with the extension plates illustrated in their extended position.

When panel 30 is in the position shown in full lines of FIG. 5, the height of the bed, i.e. the vertical distance between the bottom surface of panel 30 and the bottom surface of the guides 24, will be at a maximum. By loosening fastener 88 and moving fastener 92 from the lower of apertures 90, panel 30 may be pivoted downwardly about the horizontal axis defined by pins 84. With fastener 92 positioned in the upper aperture 90, the position indicated by the phantom lines in FIGURE 5, the trailing end of panel 30 moves downwardly to substantially reduce the height of the bed. Due to the inclination of walls 36a and 34b (FIG. 4) however, the side edges of panel 30 will be spaced from the outer surfaces of the side walls of the adjacent guides. In order to provide a continuous surface between side walls 36 and 34 of adjacent guides 24 for forming the top of the bed, a pair of extension plates 94 and 96 are secured to the lower surface of panel 30 by means of fasteners 98 and 100, respectively. As shown in FIGURE 6, fasteners 98 and 100 are off center with respect to the longitudinal axis of their respective extension plates. Extension plates 94 and 96 project beyond the trailing end of panel 30 and are received between a wear plate 102 and a clamping plate 104 (FIG. 5). A portion 106 of clamping plate 104 projects over the upper surface of panel 30 so that the bed shaping panel is clamped between extension plates 94, 96 and portion 106. A series of apertures 108 are formed in each end of clamping plate 104. Apertures 108 register with slots 110 and 112 formed in the ends of extension plates 94 and 96, respectively. Fasteners 114 and 116 secure the ends of extension plates 94 and 96 between wear plates 102 and clamping plate 104.

With reference to FIGURE 6, when panel 30 is in the position indicated by phantom lines in FIGURE 5, or one of the intermediate positions between the phantom lines and full line, fasteners 98 and 114 of extension plate 94 are loosened permitting the extension plate to be pivoted about fastener 98 until it projects outwardly beyond the side edges of panel 30 into contact with the outer surface of side wall panel 36a as shown in FIGS. 4 and 6. Similarly, by loosening fasteners 100 and 116, extension plate 96 can be extended until it contacts the outer surface of side wall panel 34b.

The maximum and minimum bed heights are indicated at h1 and h2, respectively, in FIG. 4. Side wall panels 34 and 36 of the adjacent guides 24 provide downwardly and outwardly sloping sides for the beds in either position of panel 30 with the extension plates 94 and 96 being extended or retracted as necessary to form the top of the bed.

For the initial shaping operation, soil deflectors 120 may be mounted on the outer guides 24a and 24e as shown in FIGS. 1, 2 and 3. Deflectors 120 are attached to a bracket 118 secured to outer guide 24a between the front end 50 and fitting 52. Bracing for the soil deflector is provided by a bar 122 attached at its ends to deflector 120 and flange 46a.

FIGURE 7 illustrates one form of draft linkage and leveling system attached to carrier 10. Journalled on a strut 130 mounted on a rock shaft 126 is a transport wheel 131. Rock shaft 126 is mounted on bearings 128 rotatably journalled on a mounting member 124 attached to frame members 12. Strut 130 is pivotally secured at its upper end with a link 132, the other end of which is pivotally connected with a lever 134. Lever 134 is mounted on a rock shaft 136 which in turn is journalled for rotation in bearing members mounted on a mounting member 138 attached to frame members 12.

Supported at one end on rock shaft 136 is a lever 140 which is pivotally connected at its other end with a link or rod 142. The other end of rod 142 is pivotally attached to one end of a bell crank 144. Bell crank 144 is pivotally mounted at 143 on a bracket 145 secured to carrier 10. The lower end of bell crank 144 is pivotally connected with one end of a push rod 146 having its other end pivotally connected with a bracket 148 mounted on a draft link 150. Draft link 150 is pivotally connected with a stationary arm 152 extending from carrier 10.

In operation, draft link 150 is secured to a tractor or similar towing vehicle with draft link 150 normally oriented in a horizontal position with respect to the carrier and guide assembly as shown in FIGURE 7. As the assembly is pulled toward the left in FIG. 7, the loosened earth is formed into alternating beds and furrows having a cross section defined by the outer surfaces of side wall panels 34 and 36 and the bottom surfaces of panel 30 and wear plate 64 (FIG. 4). Guides 24 form and shape the furrows and wear plate 102 at the trailing end of bed shaping panel 30 shapes the top of the bed between the furrows. Soil deflectors 120 on outer guides 24a and 24e prevent overflow of loose soil on the previously shaped bed during the shaping operation. Stationary panels 74 together with panels 38 and 40 of the guides funnel the displaced earth between side wall panels 34 and 36 underneath bed shaping panel 30. The upward and forward inclination of panel 74 as well as flange 76 prevent the overflow of soil over the bed shaper.

For maintaining a constant depth of the bed and furrows regardless of the contour of the ground over which the carrier is towed, wheel 131 is moved upwardly or downwardly relative to the carrier and shaping unit in response to upward or downward displacement of the towing vehicle relative to the carrier and shaper. Upon upward movement of the towing vehicle, draft link 150 pivots in a clockwise direction about pivot 151 and, acting through push rod 146, causes bell crank 144 to pivot in a counter-clockwise direction about pivot 143 (FIG. 7). Counter-clockwise rotation of bell crank 144 in turn causes counterclockwise rotation of rock shaft 136 by means of link 142. Lever 134 rotates counter-clockwise with rock shaft 136, which rotation is transmitted to rock shaft 126 through link 132. Thus, as the towing vehicle moves upwardly relatively to the bed shaping unit and carrier, links 146, 142 and 132 cause corresponding upward movement of wheel 131. Downward movement of the towing vehicle relative to the carrier causes links 146, 142 and 132 to be moved in the opposite direction to lower wheel 131 relative to the bed shaping unit. For transport, a hydraulic cylinder 154 having a push rod 155 pivotally connected with lever 134 may be actuated through a conduit 156 from a source of hydraulic pressure (not shown) to pivot rock shaft 126 in a clockwise direction and raise the entire unit off the ground for transport.

During the shaping operation, planting and fertilizing equipment may be mounted on tool bars 18 and 20 for shaping, fertilizing and planting in a single operation.

After shaping and planting, the bed shaping panel 30, panels 74 and soil deflectors 120 are removed and guides 24 operate in the previously formed furrows to accurately guide cultivating equipment mounted on tool bars 18 and 20.

In FIGURE 8, link 132, rock shaft 126, and lever 134 are eliminated, and wheel strut 130 is mounted directly on rock shaft 136. Push rod 155 is pivotally secured at the upper end of strut 130. The operation of the FIG. 8 embodiment is otherwise the same as that described above with respect to FIG. 7.

While five guides 24 and four bed shapers 30 are shown in the drawings, it should be obvious that a greater or lesser number may be provided as conditions require.

While the invention has been described in connection with preferred embodiments, it should be understood that we do not intend to limit the invention to the exact construction shown. On the contrary, we intend to cover all alternatives, modifications and equivalents as may be included within the spirit and scope of the invention.

We claim:

1. An earth working tool including a plurality of guide members, each adjacent pair of said guide members having opposed, upwardly converging side walls, a shaping member mounted between said opposed side walls for movement between a first position in which the side edges of said shaping member are disposed in parallel, contiguous relationship with the upper edges of said opposed side walls and a selected one of a plurality of positions in which the side edges of said shaping member are at least partially below the upper edges of said opposed side walls and spaced from said side walls, and extension plates mounted on said shaping member for movement between a retracted position in which the extension plates are disposed inwardly of the side edges of the shaping member permitting the shaping member to assume said first position and bridge the space between the upper edges of said side walls, and an extended position in which the extension plates project beyond the side edges of said shaping member permitting said extension plates to engage said side walls when said shaping member is in said selected position to bridge the space between the side edges of said shaping member and said side walls.

2. An earth working tool comprising; a guide member having a bottom wall and a side wall extending upwardly and outwardly from the bottom wall, a shaping member mounted on said guide member on the opposite side of said side wall from said bottom wall and extending outwardly from said side wall in the opposite direction from said bottom wall, said shaping member being movable from a first position in which the edge thereof is in parallel contiguous relationship with the upper edge of said side wall and a selected one of a plurality of positions in which the edge of said shaping member is below said upper edge and spaced laterally from said side wall and an extension plate mounted on said shaping member for movement between a retracted position when said shaping member is in said first position and an extended position projecting from the edge of said shaping member into engagement with said side wall to bridge the space between said shaping member and said side wall when said shaping member is in said selected position.

3. An earth working tool comprising a plurality of guide members each having a pair of upwardly diverging side walls and a pair of first panels converging from the forward edge of the side walls to a point to define the front end of the guide, a bed shaping panel pivotally mounted between the upper forward edges of the opposed, converging side walls of adjacent pairs of said guides and extending rearwardly from said forward edge, means for selectively securing said bed shaping panel in either a substantially horizontal position in parallel relationship with the upper edges of said opposed side walls to bridge the space between said upper edges, or inclined positions with respect to said upper edges, and extension plates mounted on said bed shaping plate movable to extend laterally from the side edges of said panel to bridge the space between said panel and said opposed side walls when said panel is in said inclined positions.

4. In an earth working implement including at least one pair of opposed, upwardly converging walls having generally parallel, spaced upper edges, a panel having one end pivotally mounted between the forward ends of said upper edges with its other end extending rearwardly from the forward ends of said upper edges, a pair of extension plates each having one end pivotally secured to the lower side of said panel adjacent said one end of said panel, and extending rearwardly beyond said other end of said panel, means for selectively securing said panel in either a parallel position with respect to said upper end to bridge the space therebetween, or inclined positions with respect to said upper edges, said extension plates being pivotal to extend laterally from said panel to bridge the space between said panel and the opposed, upwardly converging walls when the panel is inclined.

References Cited by the Examiner

UNITED STATES PATENTS 2,975,842    3/61    Mostrong _____ 172—252
3,128,833    4/63    Johnson et al. _____ 172—245

T. GRAHAM CRAVER, *Primary Examiner.*